US011589710B2

(12) United States Patent
Staiano et al.

(10) Patent No.: US 11,589,710 B2
(45) Date of Patent: Feb. 28, 2023

(54) SNAP TOGETHER HERB GRINDER SYSTEM

(71) Applicant: VOLO TRADE, INC., Miami, FL (US)

(72) Inventors: Mark Staiano, Miami, FL (US); Dan Talbot, Montreal (CA)

(73) Assignee: VOLO TRADE, INC., Miami, FL (US)

( * ) Notice: Subject to any disclaimer, the term of this patent is extended or adjusted under 35 U.S.C. 154(b) by 9 days.

(21) Appl. No.: 16/881,841

(22) Filed: May 22, 2020

(65) Prior Publication Data
US 2020/0367695 A1    Nov. 26, 2020

Related U.S. Application Data

(60) Provisional application No. 62/851,751, filed on May 23, 2019.

(51) Int. Cl.
*A47J 42/40*    (2006.01)
*A47J 42/34*    (2006.01)

(52) U.S. Cl.
CPC ............. *A47J 42/40* (2013.01); *A47J 42/34* (2013.01)

(58) Field of Classification Search
CPC .. A47J 42/12; A47J 42/14; A47J 42/20; A47J 42/32; A47J 42/34; A47J 42/40
See application file for complete search history.

(56) References Cited

U.S. PATENT DOCUMENTS

| | | | |
|---|---|---|---|
| 4,280,666 A | 7/1981 | Jones | |
| 7,367,519 B2 | 5/2008 | de Groote et al. | |
| 7,422,170 B2 | 9/2008 | Bao | |
| 8,083,167 B1 | 12/2011 | Namakian et al. | |
| 8,733,679 B2 * | 5/2014 | Camitta | B02C 18/16 241/30 |
| 9,427,020 B2 | 8/2016 | Ruzycky | |
| 2014/0070038 A1 * | 3/2014 | Wade | A47J 42/18 241/100 |
| 2018/0199759 A1 * | 7/2018 | Qiu | A47J 42/20 |
| 2019/0269278 A1 * | 9/2019 | Neury | A47J 42/34 |
| 2020/0237158 A1 * | 7/2020 | Gorodetzer | A47J 42/38 |

\* cited by examiner

*Primary Examiner* — Adam J Eiseman
*Assistant Examiner* — Mohammed S. Alawadi
(74) *Attorney, Agent, or Firm* — McHale & Slavin, P.A.

(57) ABSTRACT

The present invention involves a device and system for grinding herbs, tobacco, leaves and the like. The herb grinder system herein includes a snap together configuration. The lid is provided with magnets positioned around an upper shoulder. These magnets cooperate with secondary magnets positioned around the upper perimeter of the body to hold the lid in place for use, and when not being used for grinding. The bottom portion of the body is provided with a second storage pilot that includes a cup seal. The cup seal is constructed to allow the storage container to be slipped over the pilot and retained in position by friction provided by the cup seal, even when filled with tobacco or the like from the grinder. Removal of the storage container simply requires the user to pull the storage container away from the body.

18 Claims, 11 Drawing Sheets

SNAP TOGETHER HERB GRINDER SYSTEM

RELATED APPLICATIONS

In accordance with 37 C.F.R 1.76, a claim of priority is included in an Application Data Sheet filed concurrently herewith. Accordingly, under 35 U.S.C. § 119(e), 120, 121, and/or 365(c) the present invention claims priority of U.S. Patent Application No. 62/851,751, entitled "SNAP TOGETHER HERB GRINDER SYSTEM", filed on May 23, 2019. The contents of each of the above referenced applications are herein incorporated by reference in its entirety.

BACKGROUND

In general, tobacco and botanical herb grinders are cylindrical devices divided into two halves with sharp pegs or teeth aligned such that, when the halves are rotated with respect to each other, the material inside is shredded. Herb grinders are made from wood, plastic or metal, and may be manual or electric. They are commonly used for refining marijuana or tobacco, as well as in the kitchen for crushing spices and herbs.

A grinder of background interest is shown in U.S. Pat. No. 7,422,170. In this device, the grinder plates are secured by friction to the rotatable halves of the grinder to make manufacturing of the device easier. However, the friction securement between the components often allows the grinding plates to spin within the housing, binding the rotation of the device, thus reducing the volume of material ground and the ability of the operator to control the grind and the grind size.

U.S. Pat. No. 4,280,666 discloses an herb grinder that utilizes bayonet mounts to secure the portions of the herb grinder together. Unfortunately, the bayonet mounts form places for the ground herbs to accumulate and complicate cleaning of the device.

U.S. Pat. No. 7,367,519 discloses a processing tool for foodstuffs. The device is held together by providing tapered surfaces that are pushed together. Outwardly extending ribs are also provided to prevent unwanted rotation of some components.

U.S. Pat. No. 7,422,170 discloses a leave grinder that includes several components stacked together. A central magnet is used to hold a lid in place; the remainder of the disclosure is devoid of how the components are held together.

U.S. Pat. No. 8,083,167 discloses a leaf grinding device that utilizes a bayonet mount system for attaching the components together.

U.S. Pat. No. 8,733,679 discloses a shredder. The shredder device utilizes threads to attach the components of the shredder together.

U.S. Pat. No. 9,427,020 discloses a grinder secured together with threads. The grinder includes a second container that fits into the side of the grinder that can be removed to dispense the ground contents.

There are ergonomic needs that an herb grinder system must satisfy in order to achieve acceptance by the end user. The system must be easily and quickly assembled using minimal hardware and requiring a minimal number of tools. Further, the herb grinder system should not require excessive strength to assemble, or include cumbersome and difficult to use component parts. Moreover, the system must assemble together in such a way so as not to detract from the aesthetic appearance of the herb grinder system.

Thus, the present invention provides an herb grinder system which overcomes the disadvantages of prior art grinder devices. The herb grinder system of the present invention not only provides for relative ease in assembly and use, it also permits alteration of the grinding system without the need to carry additional system components separately from the grinder. The present invention also provides a storage area for herbs or the like, thereby eliminating the need for transporting additional storage devices.

SUMMARY OF THE INVENTION

Briefly, the present invention involves a device and system for grinding herbs, tobacco, leaves and the like. The herb grinder system herein includes a snap together configuration. The upper and lower grinding plates are provided with blades having a modified pyramid shape, which provides sharp leading edges regardless of which direction the lid member of the grinder housing is rotated. The lid containing the upper grinding plate is cylindrically piloted to assure that the modified pyramids pass each other without contact to grind and pulverize contents. The lid is also provided with magnets positioned around an upper shoulder. These magnets cooperate with secondary magnets positioned around the upper perimeter of the body to hold the lid in place for use and when not being used for grinding. The cooperation of the magnets allows the lid to be piloted and simply dropped into place. The bottom portion of the body is provided with a second storage pilot that includes a cup seal. The cup seal is constructed to allow the storage container to be slipped over the pilot and retained in position by friction provided by the cup seal, even when filled with tobacco or the like from the grinder. Removal of the storage container simply requires the user to pull the storage container away from the body.

Accordingly, it is an objective of the present invention to provide an herb grinding system.

It is a further objective of the present invention to provide an herb grinding system that includes a snap together construction.

It is yet a further objective of the present invention to provide a perimeter magnet assembly for securing the lid to the body of the grinder.

It is another objective of the present invention to provide an herb grinding system that includes a cup seal for securing the storage container to the body of the grinder.

Still yet another objective of the present invention is to provide a cup seal system for the storage container that vents air when installing and removing the storage container from the body of the grinder, but provides a seal when assembled.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

DETAILED DESCRIPTION

Figure 1:
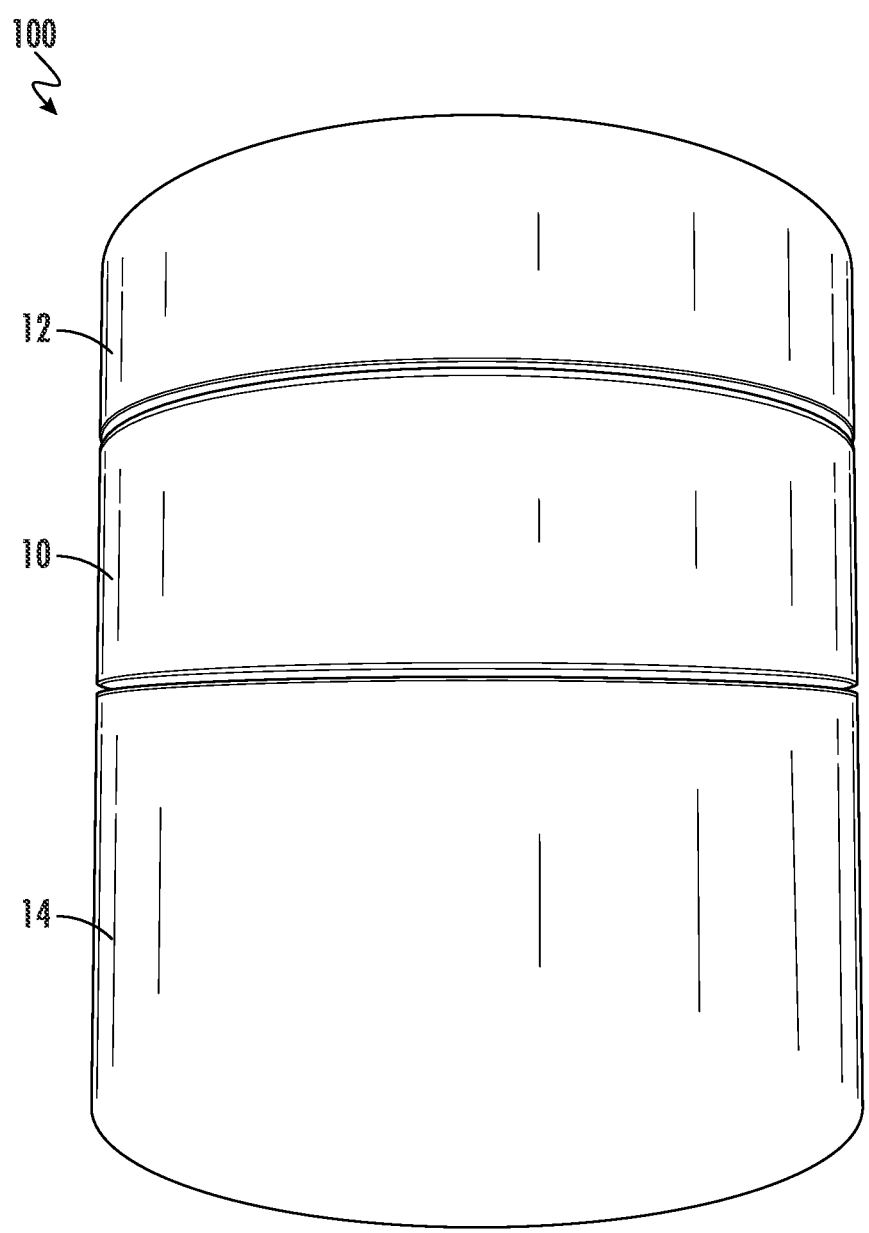
FIG. 1 is a side view illustrating one embodiment of the herb grinder system.

In this description, references to "top", "bottom", "upper", "lower", and the like merely refer to the relative positions of the elements and parts of the grinder in the figures, and do not restrict the positioning of the elements and parts in actual use.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 2:
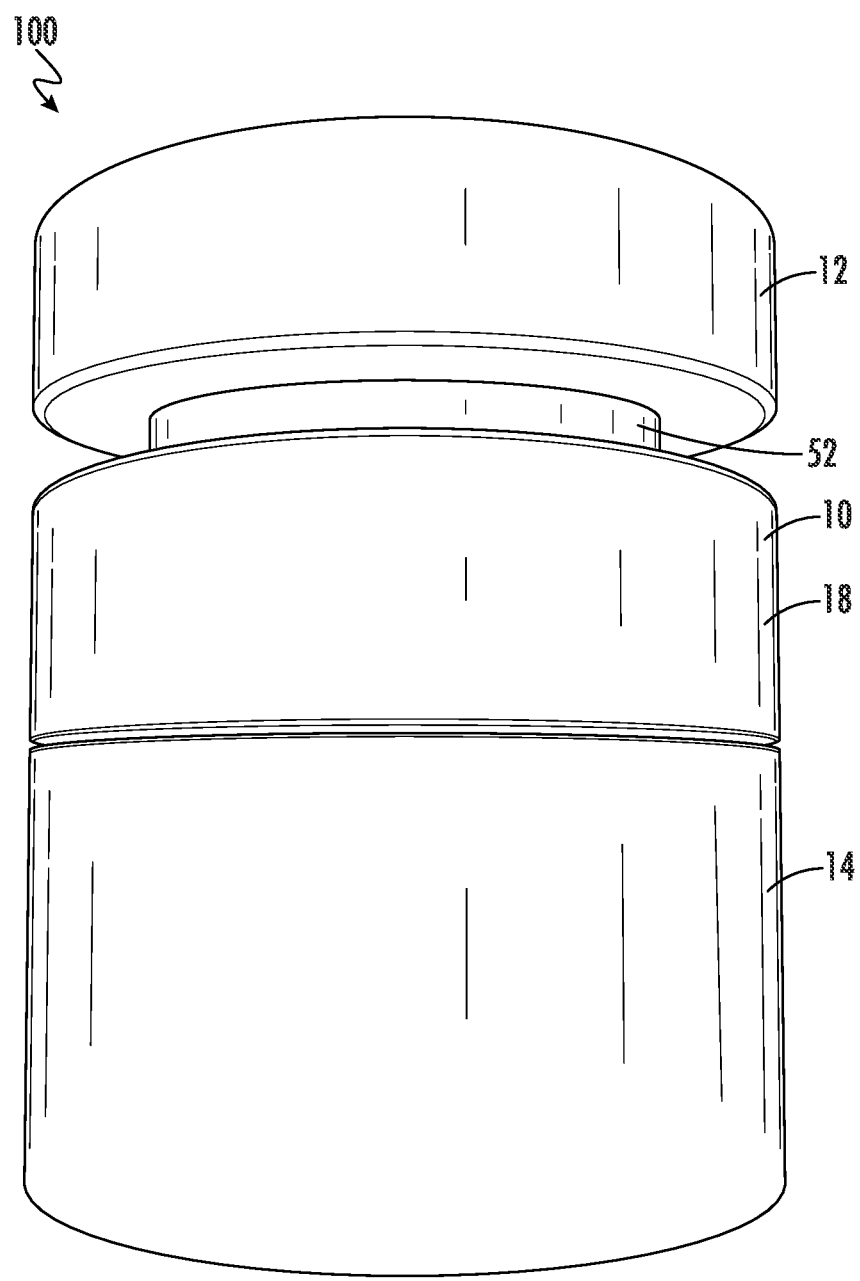
FIG. 2 is a partially exploded side view of the herb grinder system illustrated in FIG. 1.
Figure 3:
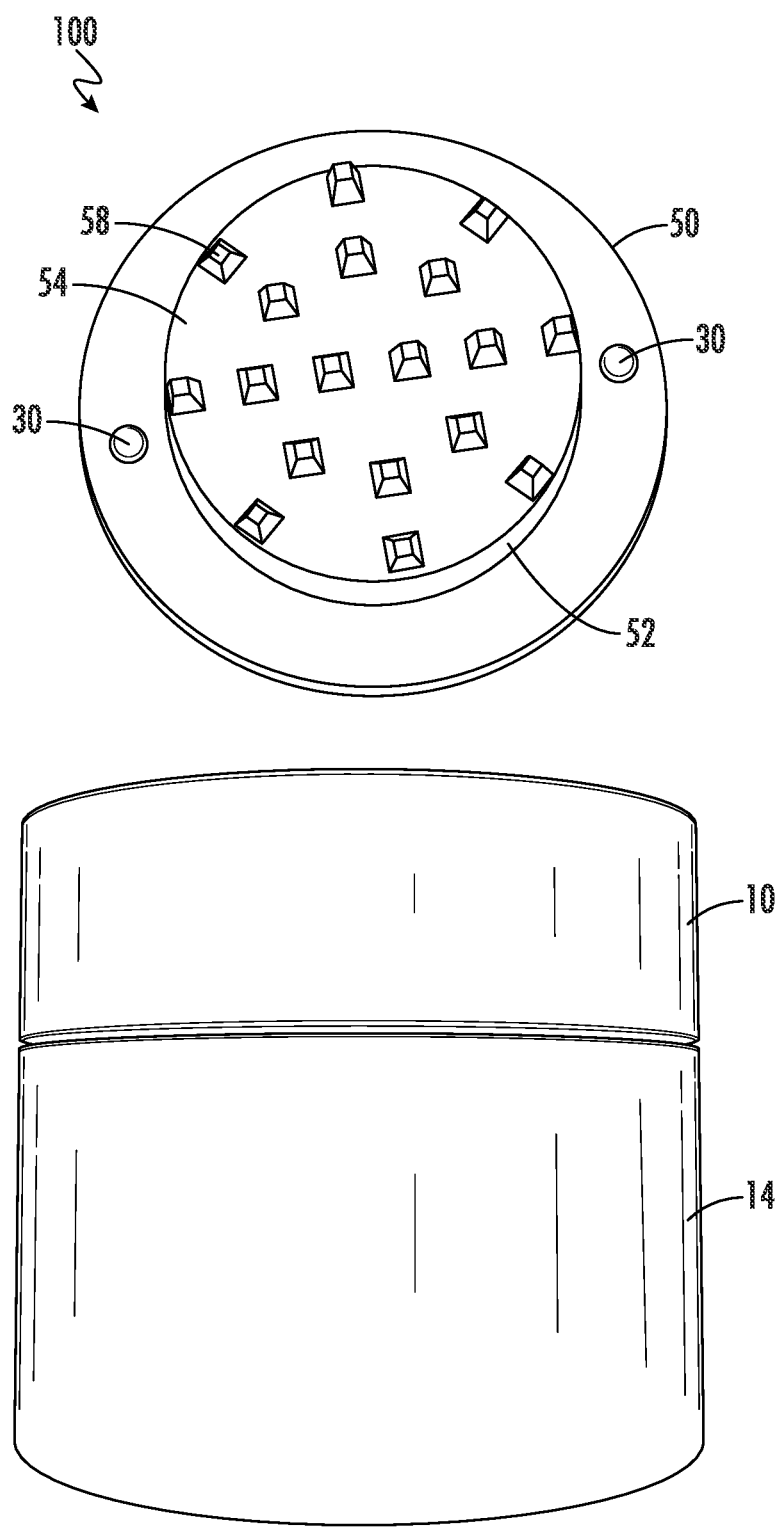
FIG. 3 is a side view illustrating the bottom side of the lid member of the embodiment illustrated in FIG. 1.
Figure 4:
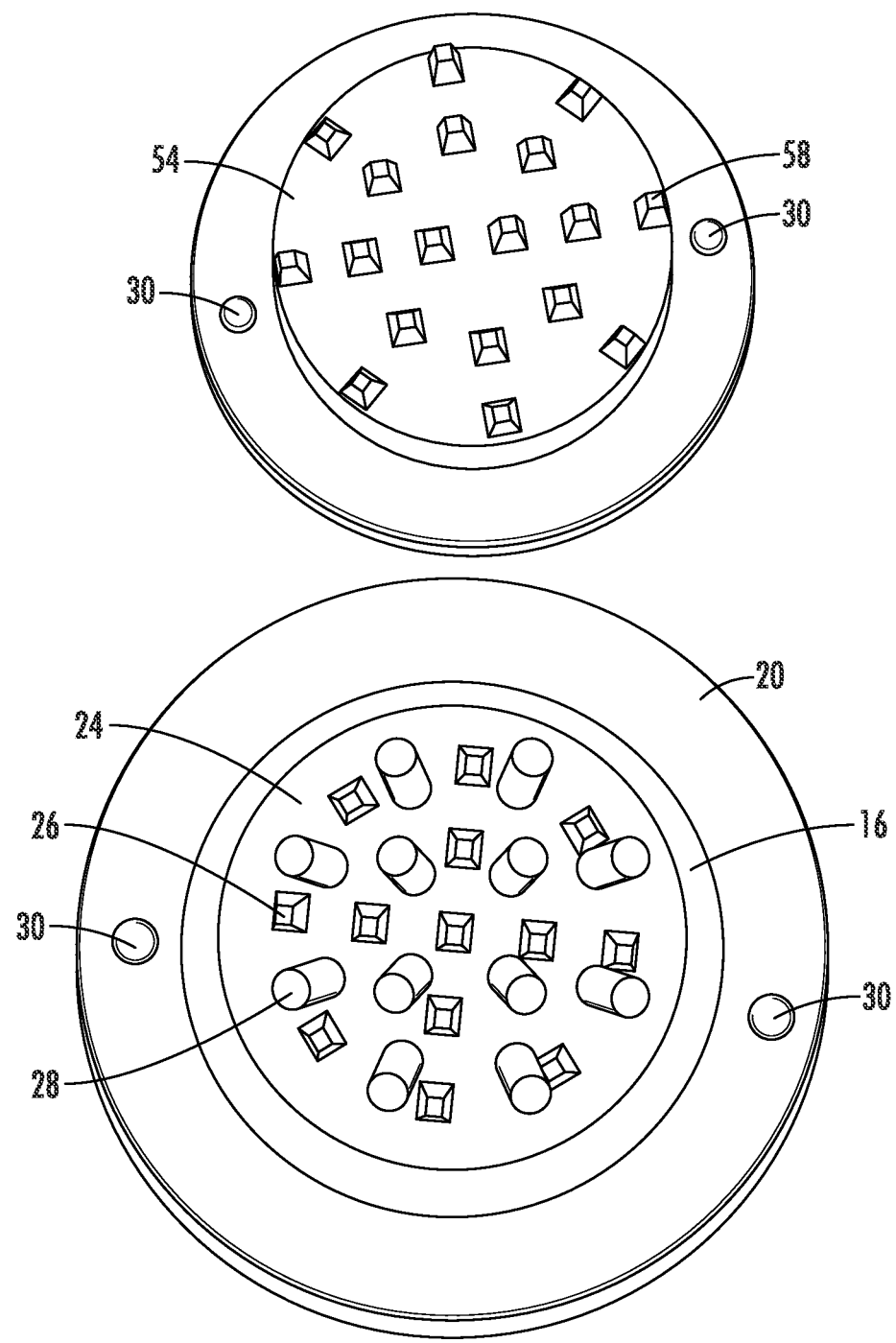
FIG. 4 is a top view illustrating the bottom side of the lid member and top side of the body portion.
Figure 5:
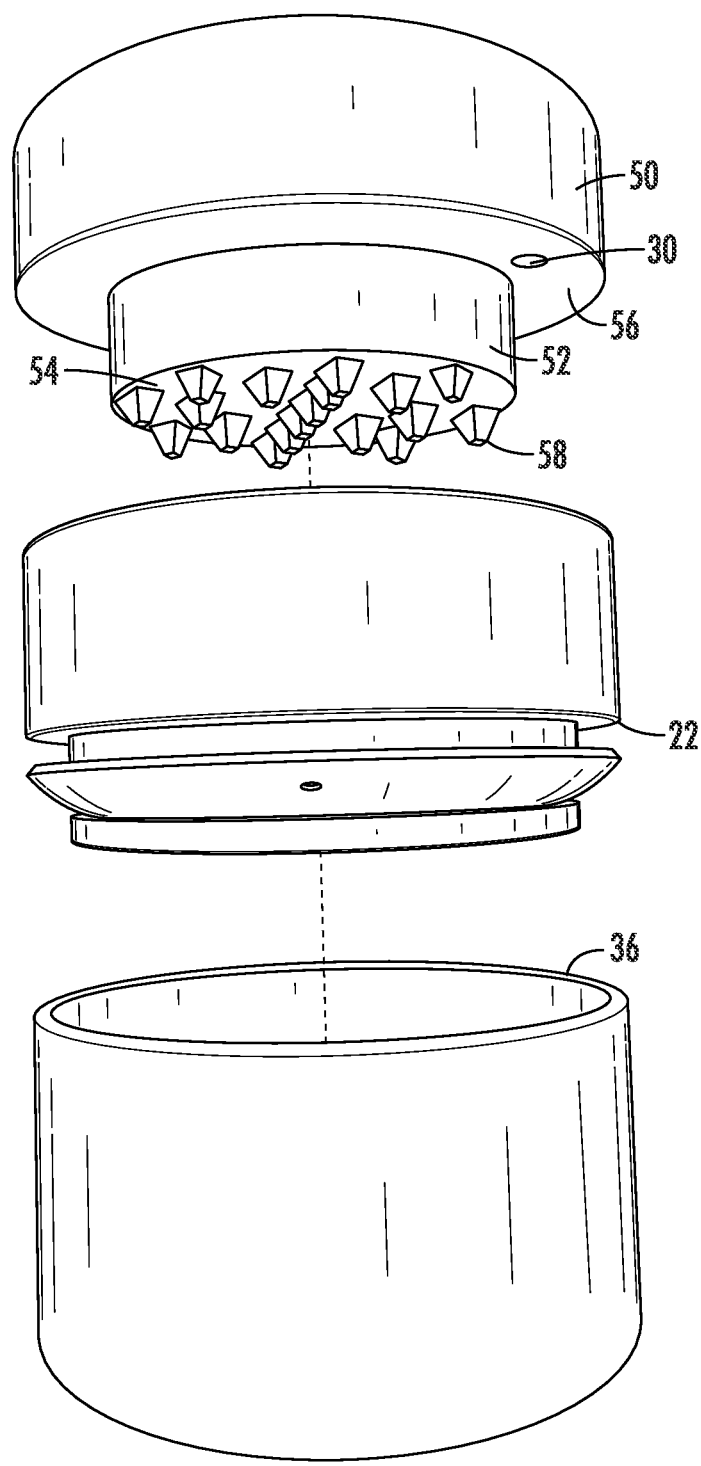
FIG. 5 is an exploded side view illustrating the snap together herb grinder.
Figure 6:
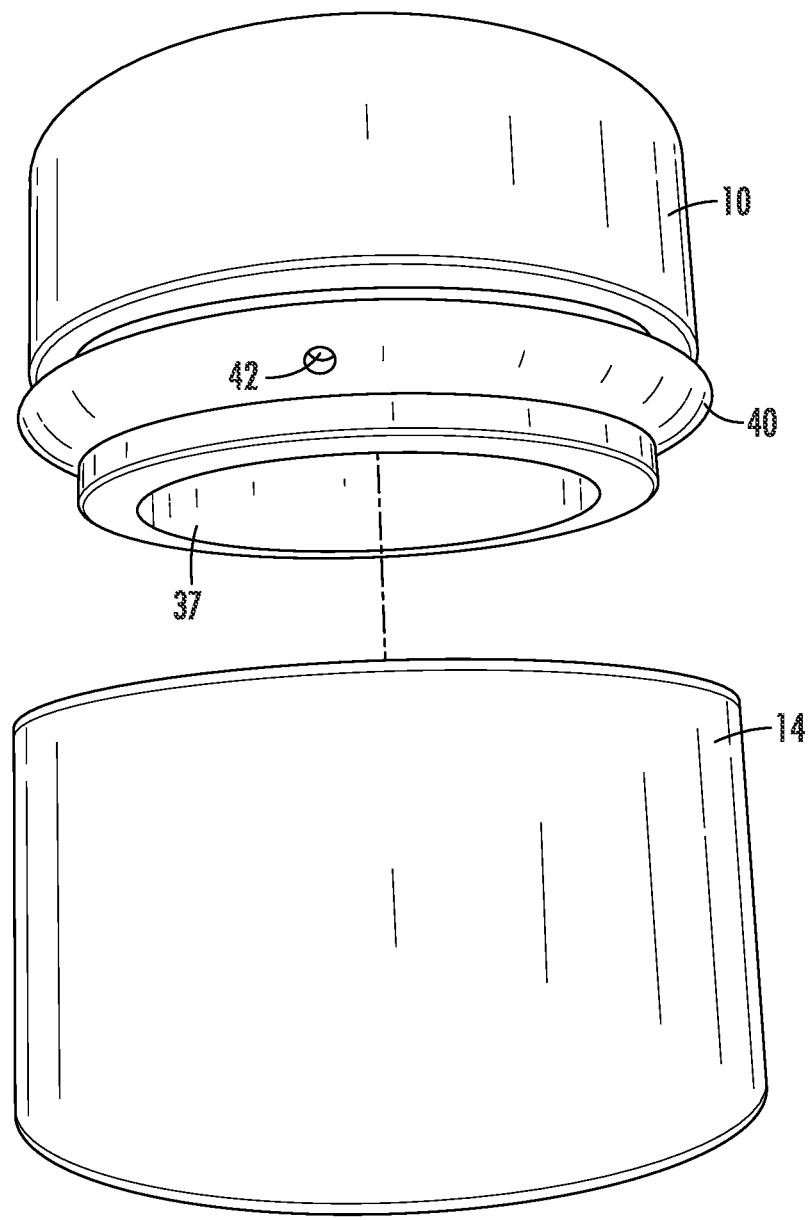
FIG. 6 is a partially exploded view thereof, illustrating the cup seal and the cup seal vent.
Figure 7:
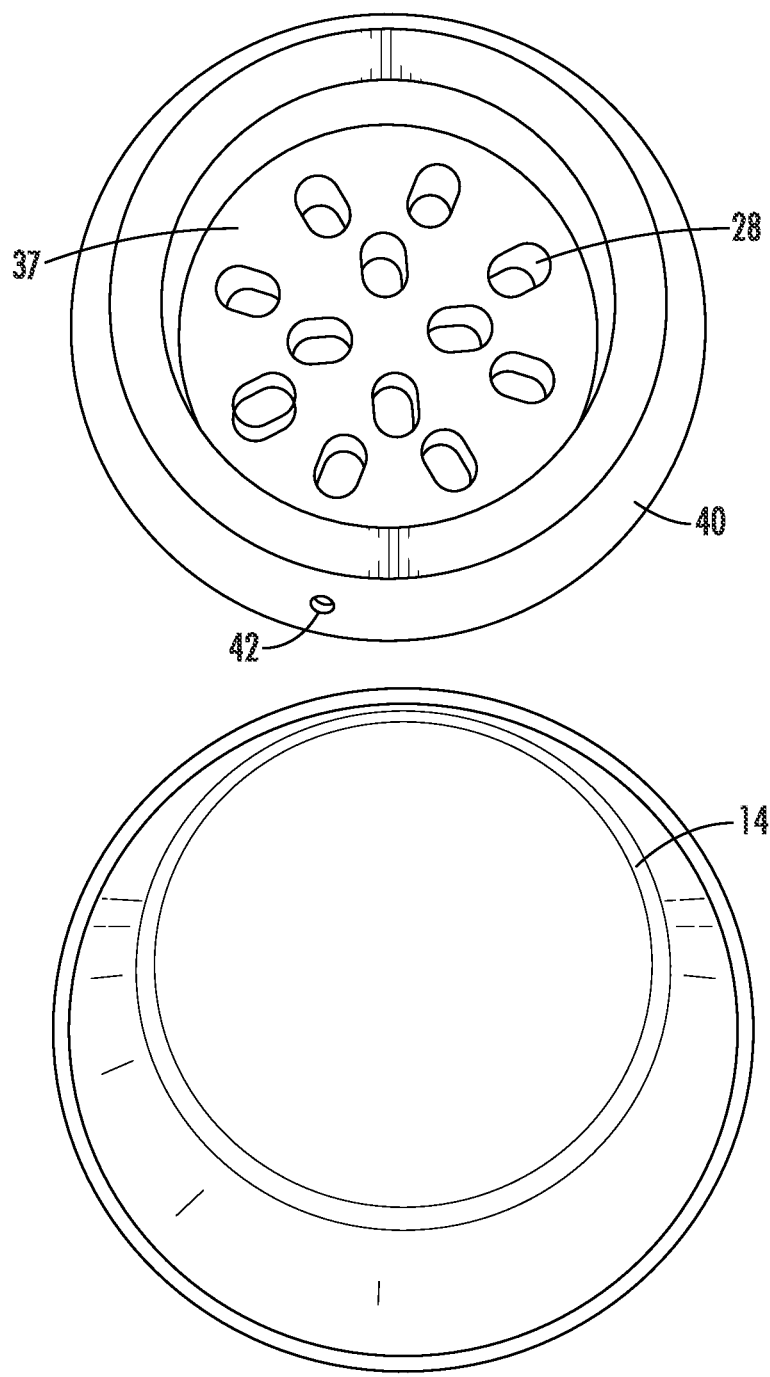
FIG. 7 is a bottom view of the body portion and a top view of the storage container for ground material.
Figure 8:
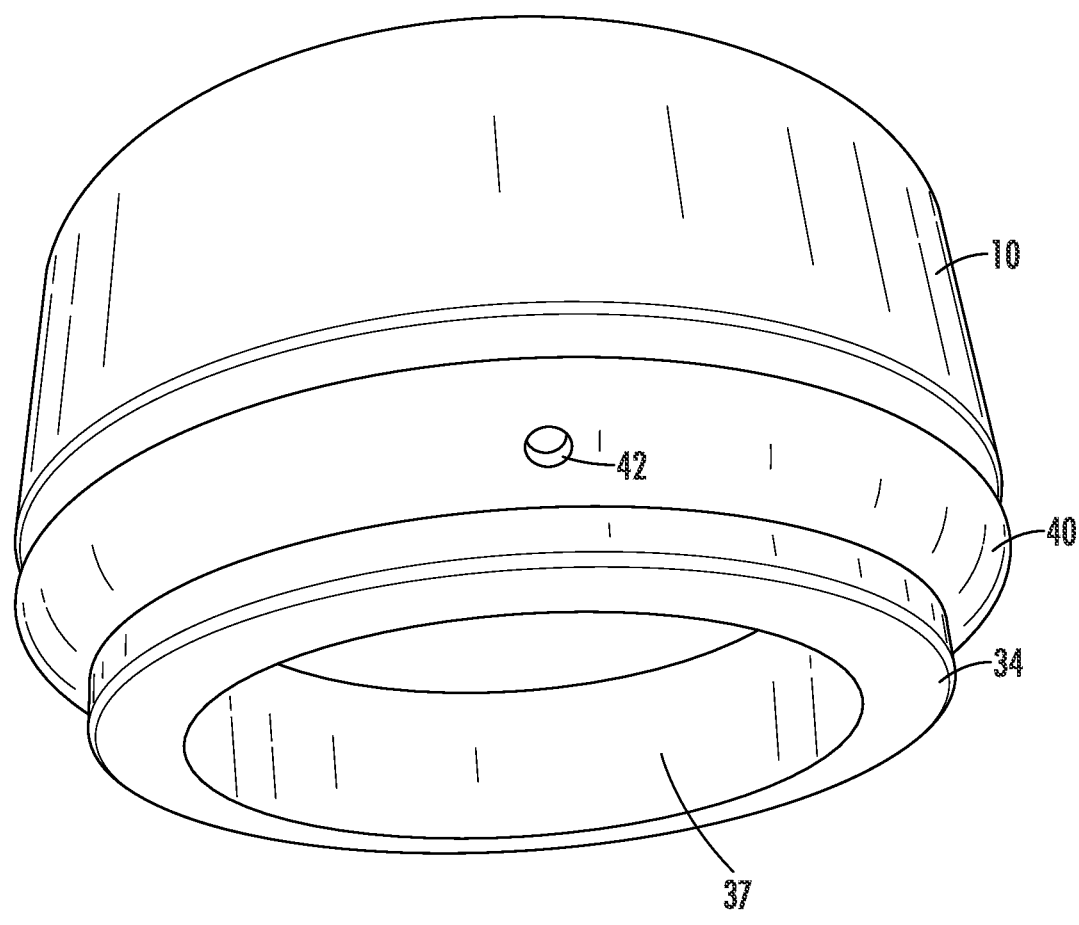
FIG. 8 is a bottom perspective view illustrating the cup seal and the cup seal vent.
Figure 9:
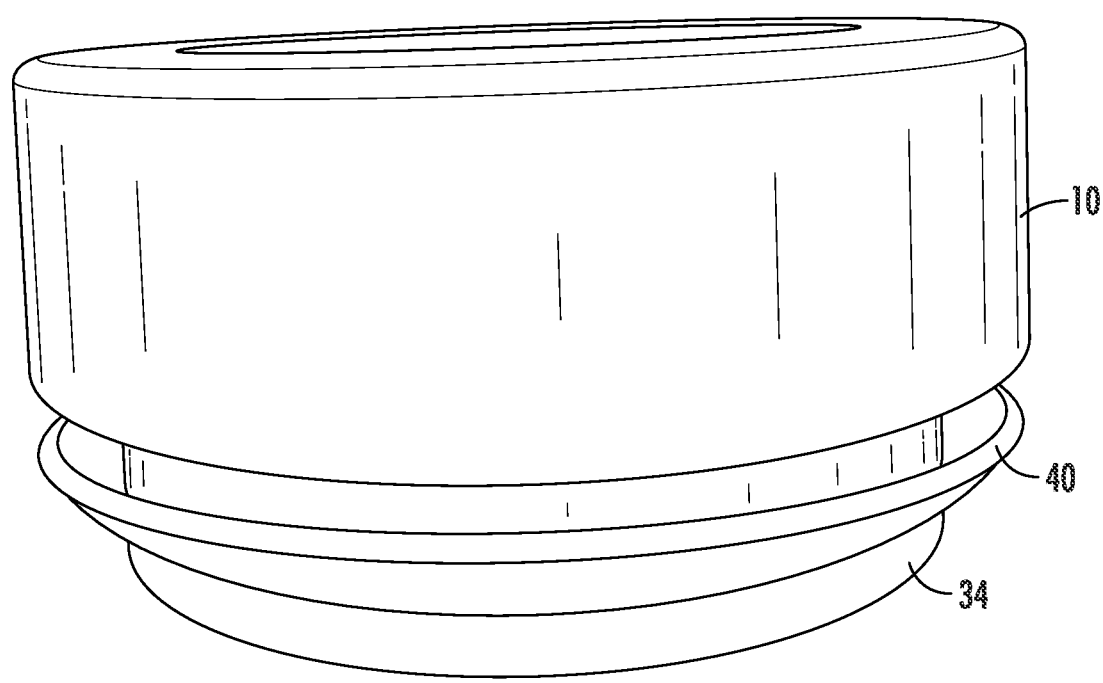
FIG. 9 is a perspective view illustrating the profile of the cup seal.
Figure 10:
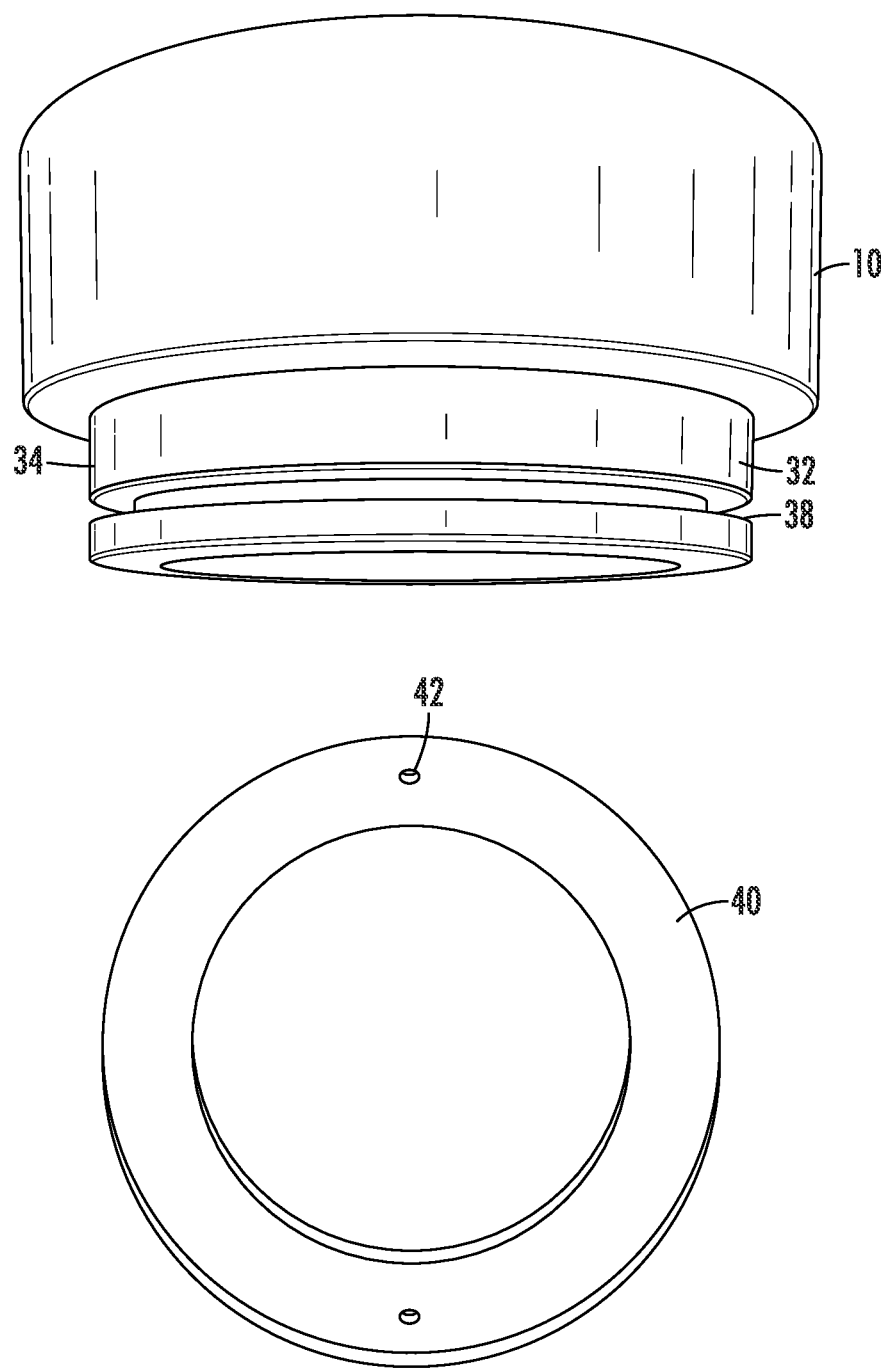
FIG. 10 is a partially exploded view illustrating the cup seal and the second storage pilot having a cup seal groove.
Figure 11:
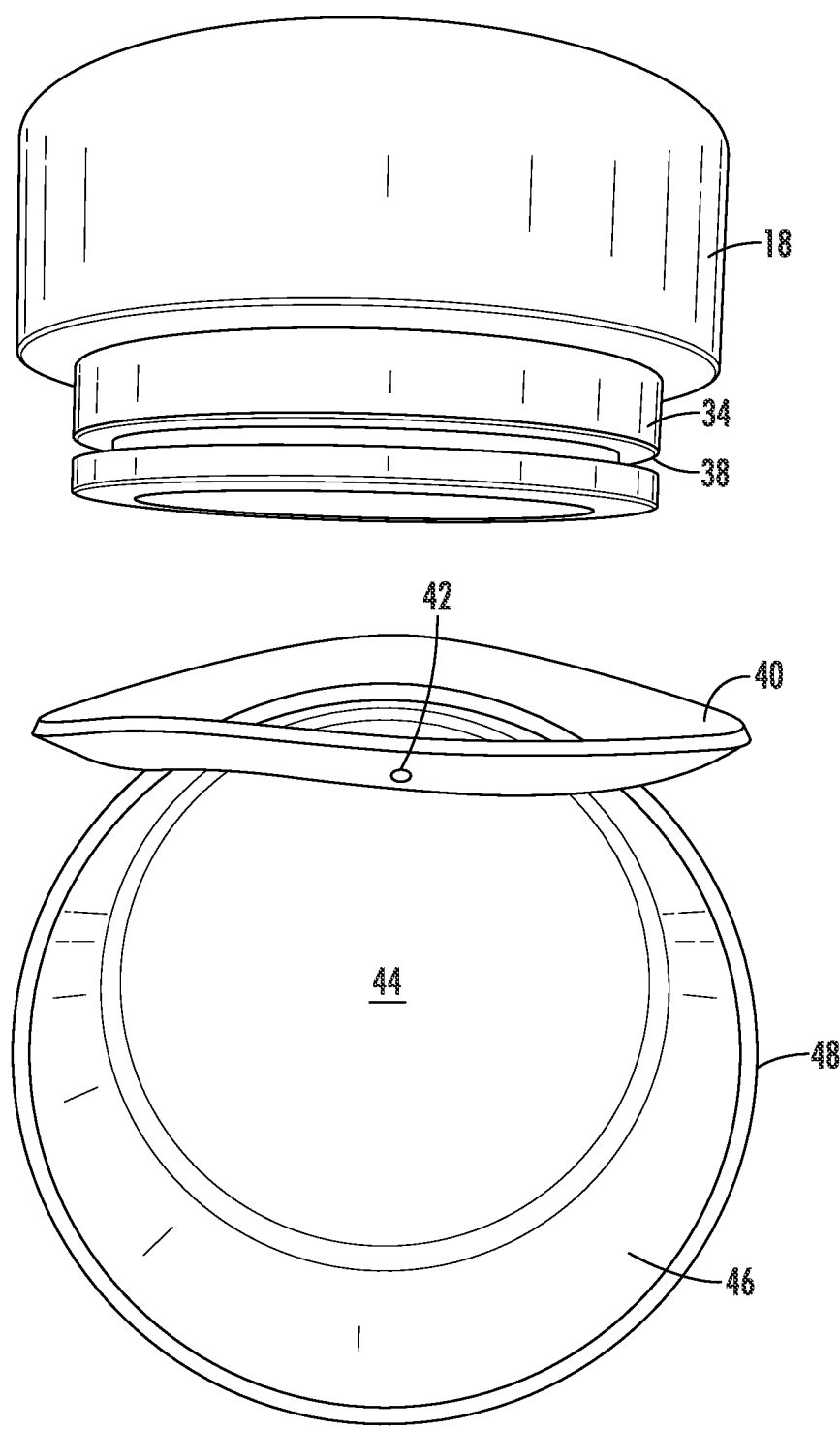
FIG. 11 is a partially exploded perspective view illustrating the body portion and the cup seal along with the storage container.

Referring to FIGS. 1-11, a snap together herb grinder system 100 is illustrated. The herb grinder system is useful for grinding herbs, tobacco, marijuana, and the like. The preferred embodiment of the herb grinder system includes a body portion 10, a lid member 12, and a storage container 14. The three components snap together and apart without twisting or operation of fasteners. The body portion 10 is generally a tubular member including an internal bore 16, an outer surface 18, a top surface 20 and a lower surface 22. The internal bore 16 terminates in a generally flat bottom including a plurality of lower grinding members 26, herein provided in the shape of truncated pyramids. It should be noted that other shapes suitable for grinding herbs, leaves and the like may be utilized without departing from the scope of the invention. Apertures 28 are provided between the lower grinding members 26 to allow the ground material to pass through to the storage container 14. The top surface 20 of the body portion 10 is substantially flat, within general manufacturing tolerances, and includes a pair of magnets 30 embedded to be flush with the top surface 20. The magnets 30 are preferably oriented in the body portion so that the magnetic field of both magnets is facing in the same direction. A bottom portion 32 of the body 10 includes a second storage pilot 34 sized to slip fit into an inner bore 36 of the storage container 14. The second storage pilot 34 includes a groove 38 sized to cooperate with a cup seal 40 and a lower bore 37 axially aligned with said upper internal bore 16 and extending toward said upper bore, increasing the size of said storage container 14. The cup seal 40 is constructed from a polymeric material such as rubber, silicone or the like, and preferably includes at least one, and more preferably two air vents 42. The air vents 42 are positioned radially around the cup seal so that they vent air from the storage container when the second storage pilot 34 is inserted into the storage container 14 and withdrawn from the storage container 14. Yet, the cup seal 40 maintains a substantially sealed environment within the storage container 14 when the storage container 14 and the body portion 10 are fully engaged to each other. The storage container 14 is generally cup shaped, having a bottom wall 44 and an upstanding and continuous side wall 46. The top rim 48 may be rounded or tapered to cooperate with the cup seal 40, or may include an enlarged rounded shape over which the cup seal 40 passes to create a better grip between the body portion 10 and the storage container 14. The storage container 14 is preferably constructed from metal, but may be constructed of any material suitable to construct a thin walled storage container. Such materials include, but should not be limited to plastic, metal, carbon fiber and suitable combinations thereof.

Still referring to the Figs., the lid member 12 includes an enlarged cap portion 50, a first pilot portion 52 and a grinding plate portion 54. The enlarged cap 50 is sized to be generally the same diameter as the body portion outer surface 18, and includes a shoulder 56 that cooperates with the top surface 20 of the body portion 10 to limit the distance that the first pilot 52 can enter the internal bore 16 of the body. The grinding plate 54 includes a plurality of upper grinding members 58 in the form of truncated pyramids that are sized and distributed to fit between the lower grinding members 26 when the lid member 12 is rotated within the body portion 10. Magnets 30 are positioned within the cap portion 50 of the lid member 12 to interact with the magnets 30 positioned in the top surface 20 of the body portion 10. In this manner, the lid portion 12 is secured to the body portion 10 even when the grinder system 100 is inverted. By using multiple magnets 30, the lid member 12 can also be oriented as desired when not in use.

It is to be understood that while a certain form of the invention is illustrated, it is not to be limited to the specific form or arrangement of parts herein described and shown. It will be apparent to those skilled in the art that various changes may be made without departing from the scope of the invention, and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A snap together herb grinder assembly comprising:
a body portion, said body portion is a cup shaped member including a first internal bore extending inwardly along a longitudinal centerline of said body portion, said first internal bore terminating in a flat bottom including a plurality of lower grinding members extending into said first internal bore, said body portion including a substantially flat top surface oriented to be perpendicular to said longitudinal centerline, a lower surface oriented to be perpendicular to said longitudinal centerline, an outer continuous surface extending between said upper surface and said lower surface, a bottom portion of said body portion including a storage pilot extending outwardly from said bottom portion of said body portion and sized to slip fit into an inner bore of a storage container, said storage pilot including a groove extending around the circumference of said storage pilot and sized to cooperate with a seal member, said seal member being constructed from a polymeric material and sized to fit partially into said groove extending around said storage pilot, a portion of said seal member extending outwardly and unguided from said groove beyond the diameter of said storage pilot to create an interference fit between said storage pilot and said inner bore of said storage container to provide snap together assembly between said body portion and said storage container;

a lid member, said lid member includes a cap portion, a first pilot portion and a grinding plate portion, said cap portion is sized to be larger than said internal bore of said body portion and includes a shoulder that cooperates with said top surface of said body portion to limit a distance that said first pilot can enter said first internal bore of said body portion, said grinding plate portion forming an end surface of said first pilot portion and including a plurality of outwardly extending upper grinding members that are sized and distributed about said grinding plate to fit between said lower grinding members when said lid member is rotated within said body portion; and a storage container, said storage container is cup shaped, having a bottom wall and an upstanding and continuous side wall terminating in a top rim forming said storage container inner bore.

2. The snap together herb grinder assembly of claim 1 wherein said seal member is a cup seal.

3. The snap together herb grinder assembly of claim 2 wherein said cup seal is oriented so that a free end of said cup seal extends toward said bottom portion of said body portion.

4. The snap together herb grinder assembly of claim 2 wherein said cup seal includes at least one aperture extending through said cup seal, said aperture constructed and arranged to allow air to escape from said storage container when said storage pilot is inserted into said storage container and whereby said aperture allows air to enter said storage container when said storage pilot is removed from said storage container.

5. The snap together herb grinder assembly of claim 2 wherein said storage pilot portion of said body portion includes a lower bore axially aligned with said upper internal bore and extending toward said upper bore, increasing the size of said storage container.

6. The snap together herb grinder assembly of claim 2 wherein said cup seal is constructed and arranged to maintain a sealed environment within said storage container when said storage container, said body portion, and said lid member are fully engaged with respect to each other.

7. The snap together herb grinder assembly of claim 1 wherein said polymeric material is silicone.

8. The snap together herb grinder assembly of claim 1 wherein said upper grinding members and said lower grinding members are provided in the shape of truncated pyramids.

9. The snap together herb grinder assembly of claim 8 wherein a plurality of apertures are provided between said lower grinding members to allow a ground up material to pass through flat bottom of said first internal bore of said body portion into said storage container.

10. The snap together herb grinder assembly of claim 1 wherein said top surface of said body portion includes a pair of magnets embedded to be flush with said top surface.

11. The snap together herb grinder assembly of claim 10 wherein said shoulder of said lid member includes a magnetic material positioned to interact with said magnets positioned in said top surface of said body portion.

12. The snap together herb grinder assembly claim 11 wherein said magnetic material is at least one magnet.

13. The snap together herb grinder assembly of claim 1 wherein said top rim of said storage container is rounded to cooperate with said seal member.

14. The snap together herb grinder assembly of claim 1 wherein said top rim is tapered from an inside surface to an outside surface to cooperate with said seal member.

15. The snap together herb grinder assembly of claim 1 wherein said top rim includes an enlarged rounded shape over which said seal member passes during assembly to create a grip between said body portion and said storage container.

16. The snap together herb grinder assembly of claim 1 wherein said storage container side wall is constructed to include a thinner side wall than a side wall of said body portion for increased storage of ground material.

17. The snap together herb grinder assembly of claim 16 wherein said storage container is constructed from metal.

18. The snap together herb grinder assembly of claim 1 wherein said cap portion of said lid member is the same diameter as said body portion outer surface.

* * * * *